Sept. 12, 1961     J. F. JONES     2,999,713
EAR CORN HOLDER
Filed Jan. 27, 1960
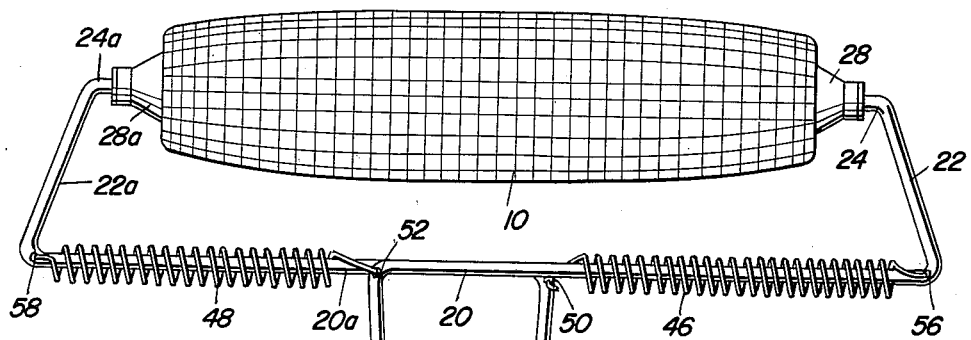
Fig.1
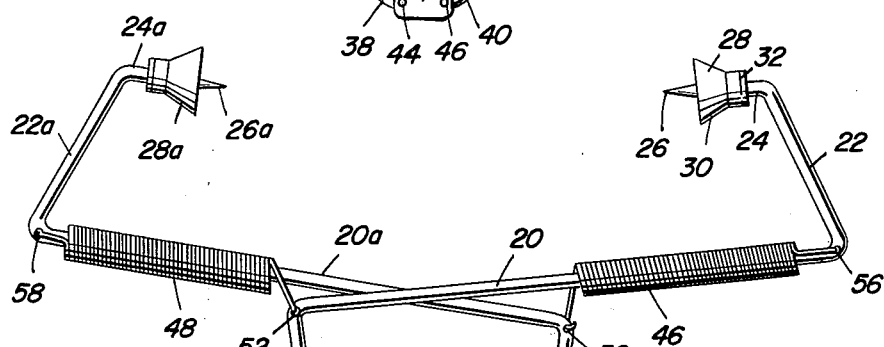
Fig.2
John F. Jones
INVENTOR.
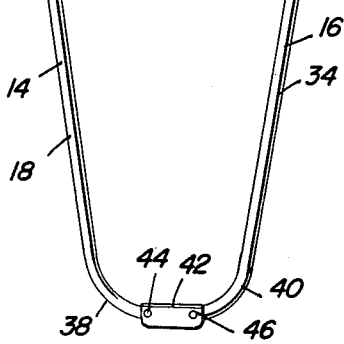

United States Patent Office 2,999,713
Patented Sept. 12, 1961

2,999,713
EAR CORN HOLDER
John F. Jones, 302½ S. Elm St., Greensboro, N.C.
Filed Jan. 27, 1960, Ser. No. 4,942
2 Claims. (Cl. 294—5)

This invention relates to utensils and more particularly to a utensil to facilitate holding an ear of corn.

An object of the invention is to provide a mechanically simple utensil which is easy to use while a person salts, butters and eats corn from the cob. The invention has the advantage of enabling the ear of corn to be held while it is still hot, and keeps the person's hands free from moisture while eating the ear of corn.

Briefly, the invention is embodied in a clamp which has prongs at the ends to engage the ends of the corn cob. The clamp is spring-biased to an operative position so that upon opening the clamp to receive the ear of corn, the force applied to open the clamp, may be relaxed to automatically engage the prongs in the ends of the ear of corn. The corn will remain in position within the clamp until it is time to dispose of the cob. Disposal is very simple, requiring only the application of force on the clamp in such direction as to withdraw the prongs from the ends of the cob. This restores the utensil to such position that it may be used for a second ear of corn.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the utensil constructed in accordance with the invention and showing the utensil provided with an ear of corn.

FIGURE 2 is an elevational view showing the utensil without the ear of corn.

In the accompanying drawings there is an illustration of an ear of corn 10. This is the preferred, if not exclusive, vegetable with which the utensil 12 may be used. The utensil is composed of a clamp having two identical arms or sections 14 and 16 configured to form a pair of jaws between which the corn cob is held. Section 14 and section 16 are each made of metal, although it is within the contemplation of the invention to use other materials, for instance plastic.

Section 14 has a side 18, and an elongate intermediate portion or member 20 extending at right angles therefrom and formed integral therewith. Member 22 projects laterally from member 20 and forms an acute angle therewith. Short member 24 is parallel to member 20 and protrudes from one end of member 22. Member 24 has a point 26 at the extremity thereof, and there is a stop 28 fixed to member 24. The stop has a truncated conical side wall 30 and a cylindrical wall 32 integral therewith. The cylindrical wall is fixed to member 24, and the wider diameter end of the truncated conical side wall 30 is adapted to contact the end of the corn cob while the point 26 pierces the rather soft center of the corn cob.

Section 16 is constructed in an identical fashion and includes side 34, members or portions 20a, 22a and 24a as well stop 28a. Sides 18 and 34 diverge and have curved lower ends 38 and 40 with the ends thereof which confront each other, connected by link 42. The link has pivot pins 44 and 46 near the ends thereof, and the pivot pins are secured to ends 38 and 40 thereby connecting sections 14 and 16 so that they are capable of articulation.

There are resilient means connected between sections 14 and 16 and arranged to move the sections to such a position that the two points 26 and 26a pierce the cob of the ear of the corn. These resilient means consist of two coil springs 46 and 48 which are mounted longitudinally on the outer portions of the crossed intermediate portions or members 20 and 20a, respectively, of the sections 14 and 16. The ends of spring 46 are hooked into apertures 50 and 52 formed at the junctures of side 34, member 28a and side 18, member 20a. The springs 46 and 48 are also engaged in apertures 56 and 58 formed at the junctures of members 20, 22 and 20a, 22a, whereby the springs 46 and 48 react on both sections 14 and 16.

In use, the sides 16 and 18 which, coupled together, form a handle, are squeezed together, and this will extend springs 46 and 48 and open the jaws of the clamp. Then, upon relaxation of the squeezing force, the two sections will be drawn together by the energy of springs 46 and 48 and cause the sharp points 26 and 26a to pierce the ends of the cob. Penetration of the points is limited of stops 28 and 28a with the end surfaces of the corn cob.

Thereafter, the corn may be salted, buttered, etc. It is also convenient for eating, since the ear of corn may be rotated on points 26 and 26a. Although stops 28 and 28a were said to be fixed, they may be rotatably mounted to turn with the ear of corn. When the corn is eaten from the cob, removal of the cob is very simple. The sides 18 and 34 are simply squeezed together thereby opening the clamp and freeing the points 26 and 26a from the ends of the cob so that the cob may fall therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holder for an ear of corn comprising a pair of divergent arms pivotally connected at one end, said arms including oppositely, substantially right angular bent and crossed intermediate portions and reversely bent free end portions terminating in opposed prongs paralleling said intermediate portions and adapted to penetrate the end portions of an ear of corn for rotatably supporting same, and a coil spring mounted longitudinally on each intermediate portion and having one end anchored to the outer end portion thereof and its other end anchored to the inner end portion of the other of said intermediate portions for yieldingly resisting swinging movement of said free end portions of said arms away from each other.

2. A holder for an ear of corn comprising a pair of divergent arms, a link pivotally connecting said arms at one end, said arms including oppositely substantially right angularly bent and crossed intermediate portions and reversely bent free end portions terminating in opposed prongs paralleling said intermediate portions and adapted to penetrate the end portions of an ear of corn for rotatably holding same, and coil springs mounted longitudinally on said intermediate portions of said arms outwardly of the crossed portions of said intermediate portions and having their outer ends anchored to the respective outer portions of said intermediate portions and their inner ends anchored to the inner portion of the other of said intermediate portions for yieldingly resisting swinging movement of said free end portions of said arms away from each other.

References Cited in the file of this patent

UNITED STATES PATENTS

| | | |
|---|---|---|
| 378,503 | Godfrey | Feb. 28, 1888 |
| 568,237 | Carley | Sept. 22, 1896 |
| 814,688 | Gitterman | Mar. 13, 1906 |
| 1,030,729 | Horton | June 25, 1912 |
| 1,419,165 | Moren | June 13, 1922 |
| 2,465,626 | Barrett | Mar. 29, 1949 |
| 2,632,275 | Richardson | Mar. 24, 1953 |

FOREIGN PATENTS

| | | |
|---|---|---|
| 150,892 | Australia | Apr. 15, 1953 |
| 92,642 | Sweden | June 21, 1938 |